(12) United States Patent
Madsen et al.

(10) Patent No.: US 8,620,883 B2
(45) Date of Patent: Dec. 31, 2013

(54) APPARATUS AND METHODS OF RECONCILING DIFFERENT VERSIONS OF AN ORDERED LIST

(75) Inventors: Ryan S. Madsen, Del Mar, CA (US); Kevin D. Lee, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 870 days.

(21) Appl. No.: 12/396,434

(22) Filed: Mar. 2, 2009

(65) Prior Publication Data

US 2010/0223239 A1    Sep. 2, 2010

(51) Int. Cl.
*G06F 7/00* (2006.01)
*G06F 17/00* (2006.01)

(52) U.S. Cl.
USPC ........................................................ 707/695

(58) Field of Classification Search
None
See application file for complete search history.

(56) References Cited

U.S. PATENT DOCUMENTS

| | | | |
|---|---|---|---|
| 5,600,834 A * | 2/1997 | Howard ......................... | 713/178 |
| 7,319,536 B1 | 1/2008 | Wilkins et al. | |
| 7,403,769 B2 | 7/2008 | Kopra et al. | |
| 7,603,385 B2 | 10/2009 | Panabaker et al. | |
| 2003/0167318 A1 | 9/2003 | Robbin et al. | |
| 2004/0139180 A1 | 7/2004 | White et al. | |
| 2006/0036549 A1 | 2/2006 | Wu | |
| 2006/0041577 A1 * | 2/2006 | Ellicott et al. ................ | 707/102 |
| 2006/0168351 A1 | 7/2006 | Ng et al. | |
| 2008/0151291 A1 | 6/2008 | Ohno et al. | |
| 2008/0168183 A1 * | 7/2008 | Marcy et al. .................. | 709/248 |
| 2009/0006498 A1 * | 1/2009 | Freedman ...................... | 707/203 |
| 2010/0082561 A1 * | 4/2010 | Rauber ........................... | 707/695 |
| 2010/0223232 A1 * | 9/2010 | Wakefield ....................... | 707/634 |

FOREIGN PATENT DOCUMENTS

| | | |
|---|---|---|
| EP | 1942425 | 7/2008 |
| JP | 2007200522 A | 8/2007 |
| JP | 2007526678 A | 9/2007 |
| TW | 200512612 | 4/2005 |
| WO | WO2004086405 A1 | 10/2004 |
| WO | 2005073856 A2 | 8/2005 |
| WO | WO2005109882 | 11/2005 |

OTHER PUBLICATIONS (Jan. 1 2006), XP002476354 Retrieved from the Internet: URL:http://ac11pda.com/Dosyalar/HTC P4350 English_UM.pdf> [retrieved on Apr. 14, 2008] the whole document.
International Search Report and Written Opinion—PCT/US2010/025829, International Search Authority—European Patent Office—Jun. 21, 2010.
HTC Smart Mobility: "Pocket PC Phone User Manual" Internet Citation Jan. 1, 2006, Chapter 4.

* cited by examiner

*Primary Examiner* — Uyen Le
(74) *Attorney, Agent, or Firm* — Stanton Braden

(57) ABSTRACT

Apparatus and methods are operable to receive a first and second version of an ordered list having a first and second plurality of ordered entries, wherein each of the plurality of ordered entries has a corresponding order index. Further, the apparatus and methods are operable to compare respective ordered entries from the first and second versions of the ordered list at a respective order index. Also, the apparatus and methods are operable to assign a penalty to each possible current list resulting from reconciling the first version and the second version of the ordered list when the comparing identifies a difference between respective ordered entries at the respective order index. Moreover, the apparatus and methods are operable to generate, based on the comparing, at least a portion of all possible current lists, and select and store one of the possible current lists as the current list based on the penalties.

24 Claims, 12 Drawing Sheets

250

| List 1 | Current List | List 2 |
|---|---|---|
| A  2PM | B  2PM | B  2PM |
| B  2PM | C  2PM | C  2PM |
| C  2PM | A  3PM | A  3PM |
| D  2PM | D  2PM | D  2PM |
| E  2PM | E  2PM | E  2PM |
| F  2PM | G  3PM | G  3PM |
| G  2PM | F  2PM | F  2PM |

| List 1 | Current List | List 2 |
|---|---|---|
| A   2PM | B   2PM | B   2PM |
| B   2PM | C   2PM | C   2PM |
| C   2PM | A   3PM | A   3PM |
| D   2PM | D   2PM | D   2PM |
| F   4PM | F   4PM | E   2PM |
| E   2PM | E   2PM | G   3PM |
| G   2PM | G   3PM | F   2PM |

| List 1 | Current List | List 2 |
|---|---|---|
| A   2PM | B   2PM | B   2PM |
| B   2PM | C   2PM | C   2PM |
| D   4PM | A   3PM | A   3PM |
| C   2PM | D   4PM | D   2PM |
| E   2PM | E   2PM | E   2PM |
| F   2PM | G   3PM | G   3PM |
| G   2PM | F   2PM | F   2PM |

| List 1 | Current List | List 2 |
|---|---|---|
| A   2PM | B   2PM | B   2PM |
| B   2PM | A   3PM | A   3PM |
| C   2PM | E   3PM | E   3PM |
| D   2PM | C   2PM | D   2PM |
| F   2PM | D   2PM | G   3PM |
| G   2PM | G   3PM | F   2PM |
|  | F   2PM |  |

| List 1 | Current List | List 2 |
|---|---|---|
| A 2PM | B 2PM | B 2PM |
| B 2PM | A 3PM | A 3PM |
| D 2PM | D 2PM | D 2PM |
| E 2PM | E 2PM | E 2PM |
| F 2PM | G 3PM | G 3PM |
| Deletion: C 2PM | F 2PM | F 2PM |
| Deletion: G 2PM | | Deletion: C 3PM |

APPARATUS AND METHODS OF RECONCILING DIFFERENT VERSIONS OF AN ORDERED LIST

REFERENCE TO CO-PENDING APPLICATIONS FOR PATENT

The present Application for Patent is related to co-pending U.S. patent application Ser. No. 12/235,550, entitled "METHODS AND APPARATUS FOR RECONCILING VERSIONS OF MEDIA CONTENT LISTS IN COMMUNICATION NETWORKS" filed Sep. 22, 2008, assigned to the assignee hereof, and expressly incorporated by reference herein.

BACKGROUND

1. Field

The disclosed aspects relate to communications networks, and more particularly, to apparatus and methods for reconciling different version of concurrently existing lists in communication networks.

2. Background

Communication devices, and more specifically wireless communication devices, such as cellular telephones, have rapidly gained in popularity over the past decade. These devices are rapidly becoming multifaceted devices capable of providing a wide-range of functions. For example, a cellular telephone may also embody computing capabilities, Internet access, electronic mail, text messaging, GPS mapping, digital photographic capability, an audio/MP3 player, video gaming capabilities and the like.

In addition, wireless communication devices are increasingly being manufactured with the ability to receive media content, such as audio content, video content, multimedia content, gaming content, data/text content or the like. As such, the communication devices may be configured to receive one-to-many transmissions, such as broadcast transmissions and/or multicast transmissions and/or one-to-one transmissions, such as unicast transmissions or the like.

With expanded storage, processing and output capabilities, portable devices that play media content (e.g., audio, video, text, haptic, etc.) are becoming ubiquitous. Such devices may be referred to as a portable media player (PMP). A PMP represents one aspect of a convergent handheld device having multiple functionalities, such as for voice and/or data communications, running software applications, organizing personal data, playing media, etc. For some users who travel frequently, a mobile communication device that serves at least in part as a PMP can become a predominant source of entertainment and information.

In one aspect, users who play or otherwise use media content may have a preference for the next media content that they wish to play, view or otherwise use. For example, a user may have a preference to view a specific motion picture or listen to a certain audio song. Preferences for playing or otherwise using media content may result in a user having a media content priority list, which defines a priority listing of the media content that a user desires to acquire or otherwise use.

In the instance in which media content is being delivered to a PMP, the use of such media content priority listings as a means of defining the order in which media content is delivered to the PMP may pose additional problems. In particular different lists may concurrently exist for a single media content user. This is because the media content list may be required or otherwise configured to be stored at the PMP and simultaneously at the network side. In such cases, a user may modify the list stored on the PMP at a point in time when the PMP does not have a connection to the network. In such instances, the modifications may not be sent to the network until a network connection is made, which may conceivably be hours or even days in terms of time. In the interim, before the PMP has had the opportunity to re-connect with the network and send the modifications to the network, the media content user may access another device, such as a PC or the like, with a network connection and provide altogether different modifications from the modifications that were made on the PMP but have yet to sent to the network. Once the network connection has been re-established by the PMP and the modifications to the priority list sent to the network, the network has no means for determining which of the modifications take precedent and, thus, which modifications should be reflected in the user's current media content priority list.

It is also possible for similar type modification conflicts to arise if the subscription for media content delivery configured for multiple users or more than one user has access to the subscription. In which case, multiple users may modify the media content list simultaneously on multiple devices (e.g. one user/subscriber modifies the list from the PMP simultaneously with another user/subscriber modifying the list from a PC). Once again, the network has no means for determining which of the simultaneous modifications take precedent and, thus, which modifications should be reflected in the subscriptions current media content priority list.

Therefore a need exists for apparatus and methods that will eliminate conflicts in having concurrently existing versions of media content lists, such as media content priority lists.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a computer-executable method of reconciling different versions of an ordered list comprises receiving, at a computer, a first version of an ordered list having a first plurality of ordered entries, wherein each of the first plurality of ordered entries has a corresponding order index. The method further includes receiving a second version of the ordered list having a second plurality of ordered entries, wherein each of the second plurality of ordered entries has a corresponding order index. Also, the method includes comparing respective ordered entries from the first version of the ordered list and the second version of the ordered list at a respective order index, and assigning a penalty to each possible current list when the comparing identifies a difference between respective ordered entries at the respective order index. The method further includes generating, based on the comparing, at least a portion of all possible current lists resulting from reconciling the first version and the second version of the ordered list. Additionally, the method includes selecting one of the possible current lists as the current list, wherein the selected one comprises a lowest cumulative penalty among all the possible current lists, and storing the current list as a current version of the ordered list.

In another aspect, at least one processor configured to reconcile different versions of an ordered list comprises a first module for receiving a first version of an ordered list having a first plurality of ordered entries, wherein each of the first plurality of ordered entries has a corresponding order index, and for receiving a second version of the ordered list having a second plurality of ordered entries, wherein each of the second plurality of ordered entries has a corresponding order index. Also, the at least one processor comprises a second module for comparing respective ordered entries from the first version of the ordered list and the second version of the ordered list at a respective order index, and a third module for assigning a penalty to each possible current list when the comparing identifies a difference between respective ordered entries at the respective order index. Additionally, the at least one processor comprises a fourth module for generating, based on the comparing, at least a portion of all possible current lists resulting from reconciling the first version and the second version of the ordered list, and a fifth module for selecting one of the possible current lists as the current list, wherein the selected one comprises a lowest cumulative penalty among all the possible current lists, and for storing the current list as a current version of the ordered list.

In yet another aspect, a computer program product stored in a memory and configured to reconcile different versions of an ordered list comprises a computer-readable medium having a plurality of codes. The medium includes a first set of codes for causing a computer to receive a first version of an ordered list having a first plurality of ordered entries, wherein each of the first plurality of ordered entries has a corresponding order index, and to receive a second version of the ordered list having a second plurality of ordered entries, wherein each of the second plurality of ordered entries has a corresponding order index. Also, the medium includes a second set of codes for causing the computer to compare respective ordered entries from the first version of the ordered list and the second version of the ordered list at a respective order index, and a third set of codes for causing the computer to assign a penalty to each possible current list when the comparing identifies a difference between respective ordered entries at the respective order index. Moreover, the medium includes a fourth set of codes for causing the computer to generate, based on the comparing, at least a portion of all possible current lists resulting from reconciling the first version and the second version of the ordered list, and a fifth set of codes for causing the computer to select one of the possible current lists as the current list, wherein the selected one comprises a lowest cumulative penalty among all the possible current lists, and for storing the current list as a current version of the ordered list.

In a further aspect, an apparatus for reconciling different versions of an ordered list comprises means for receiving, at a computer, a first version of an ordered list having a first plurality of ordered entries, wherein each of the first plurality of ordered entries has a corresponding order index, and for receiving, at the computer, a second version of the ordered list having a second plurality of ordered entries, wherein each of the second plurality of ordered entries has a corresponding order index. Also, the apparatus comprises means for comparing respective ordered entries from the first version of the ordered list and the second version of the ordered list at a respective order index, and means for assigning a penalty to each possible current list when the comparing identifies a difference between respective ordered entries at the respective order index. Additionally, the apparatus comprises means for generating, based on the comparing, at least a portion of all possible current lists resulting from reconciling the first version and the second version of the ordered list, and means for selecting one of the possible current lists as the current list, wherein the selected one comprises a lowest cumulative penalty among all the possible current lists, and means for storing, at the computer, the current list as a current version of the ordered list.

In another aspect, a reconciler apparatus configured to reconcile different versions of an ordered list comprises a reconciler operable to receive a first version of an ordered list having a first plurality of ordered entries, wherein each of the first plurality of ordered entries has a corresponding order index, and to receive a second version of the ordered list having a second plurality of ordered entries, wherein each of the second plurality of ordered entries has a corresponding order index. Further, the apparatus comprises a comparator operable to compare respective ordered entries from the first version of the ordered list and the second version of the ordered list at a respective order index, and a penalty assignor operable to assign a penalty to each possible current list when the comparing identifies a difference between respective ordered entries at the respective order index. Additionally, the apparatus comprises a list generator operable to generate, based on the comparing, at least a portion of all possible current lists resulting from reconciling the first version and the second version of the ordered list, and a selector operable to select one of the possible current lists as the current list, wherein the selected one comprises a lowest cumulative penalty among all the possible current lists. Moreover, the apparatus comprises a memory operable to store the current list as a current version of the ordered list.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 is a schematic diagram of one aspect of a reconciliation of two lists into a current list, wherein only one list is modified;

FIGS. 9 and 10 are schematic diagrams of aspects of a reconciliation of two lists into a current list, wherein the lists include multiple modifications;

FIG. 11 is a schematic diagram of one aspect of a reconciliation of two lists into a current list, including accounting for an addition;

FIG. 12 is a schematic diagram of one aspect of a reconciliation of two lists into a current list, including account for a deletion;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to apparatus and methods of reconciling different versions of a list stored on one or more computer devices and having a plurality of listed entries each having a relative order within the list. For example, such a list may include, but is not limited to, a list of content, such as a movie, to download from a website or receive via the mail, wherein the relative position of the listed content indicates a relative priority or order or timing for downloading or delivery. Such a list may be maintained on more than one device, such as at a wireless terminal, a wired terminal, and/or a network server. The respective lists therefore represent different versions of the same list. Further, on any list, a user may add or delete an entry, or change a relative order of an entry, causing the various versions of the list to be unsynchronized. Accordingly, such unsynchronized versions of the list may include, but are not limited to, version having different listed items, or the same listed items in a different order, or any combination of both. The described aspects provide apparatus and methods to consider the entries and ordering of entries in the various versions of the list in order to determine a current version of the list. Such a determination takes into account typical user expectations, as reflected in merging rules, to evaluate any differences between the lists. In particular, the described aspects evaluate all of the possible manners in which at least two different versions of a list may be reconciled, assigning a penalty to a possible current list based on divergence in listed entries of the two versions of the list, and further taking into account a timing associated with the respective listed entries. As such, logically, all possible current lists, or some subset thereof, are identified and associated with a penalty, and a current version of the list is chosen, at least in part, based on the penalty. Thus, the described aspects take into account a position in the order and a timing of each listed entry in order solve for the possible current list most likely having a correct ordering of the listed entries.

Figure 1:
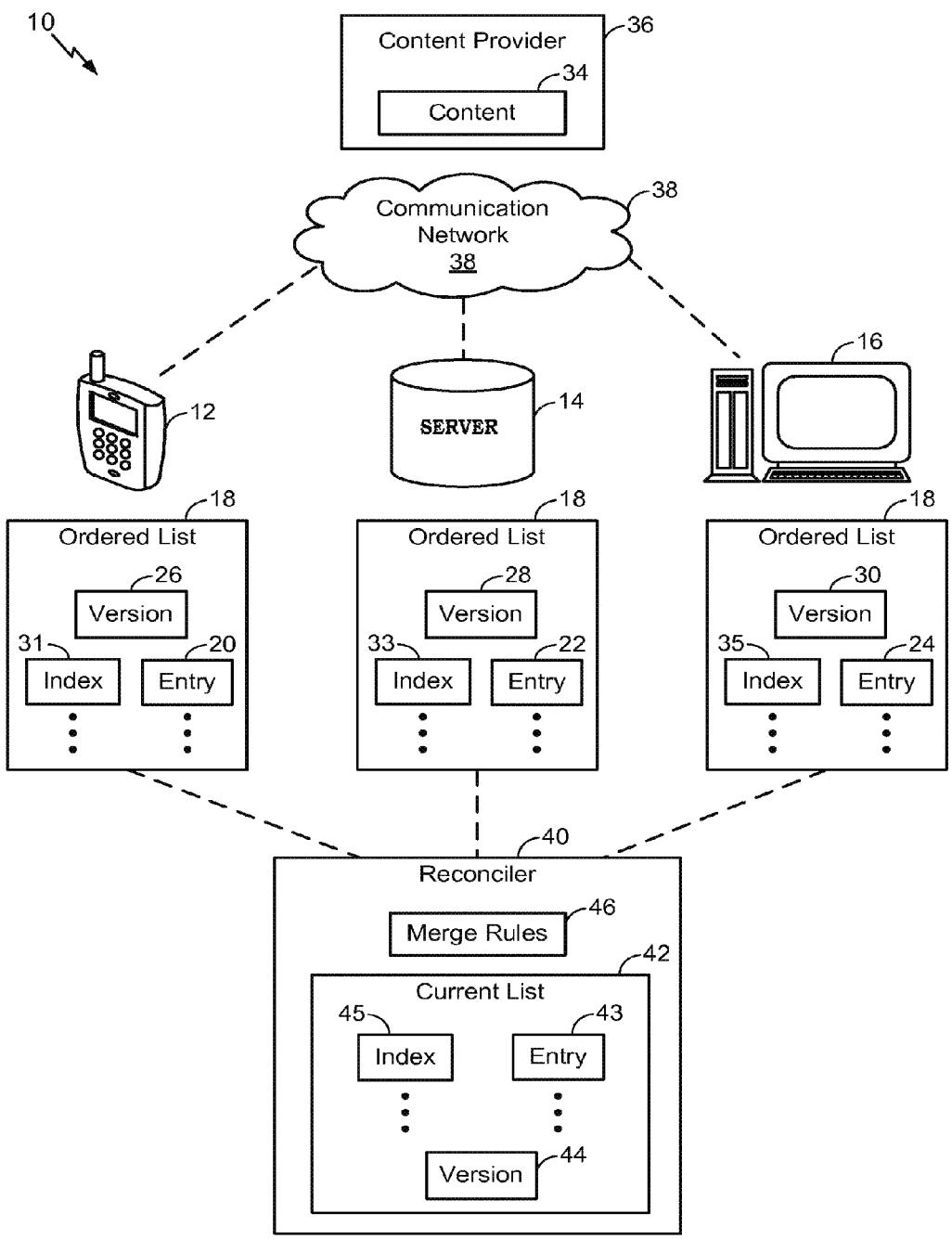
FIG. 1 is a schematic diagram of one aspect of a system for reconciling different versions of an ordered list.

Referring to FIG. 1, in one aspect, a system 10 operable to reconcile differences between lists, to determine a current or up-to-date list, includes at least two devices, such as a wireless access terminal 12, a server 14, or a wired access terminal 16, each having an ordered list 18 of a plurality of entries 20, 22, 24. Each of the plurality of entries 20, 22, 24 in each list 18 further corresponds to a relative order or index 31, 33, 35 within each list 18. Also, each list 18 corresponds to or represents a version 26, 28, 30 of list 18, such that system 10 includes two or more different versions 26, 28, 30 of the list 18 between two or more device 12, 14, 16. For example, the two or more different versions 26, 28, 30 of the list 18 may be represented by a difference in the plurality of entries 20, 22, 24, a difference in a relative position, order or index 31, 33, 35 of a given one of the plurality of entries 20, 22, 24 between two or more versions 26, 28, 30 of the list 18, or combinations of both. It should be noted that each version 26, 28, 30 does not need to be a specific attribute of each list 18, but that two lists may be considered different versions relative to one another based on the above noted relative differences between each list.

Such different versions 26, 28, 30 of list 18 may be found when system 10 includes, but is not limited to, a content acquisition system for obtaining one or more content 34 from one or more content providers 36 in communication with devices 12, 14, 16 via communications network 38. For example, content 34 may include, but is not limited to a movie, a book, a song, a media clip, or any other type of content 34 in a format, such as but not limited to an electronic file, operable to be output by one of devices 12, 14, 16 for consumption by a user of the respective device. Further, for example, content provider 36 may include but is not limited to a website, a server, a computer device, or any other source of content 34. Additionally, communication network 38 may include a wired or wireless network, or a combination of both.

In the example of such a content acquisition system, in one aspect, lists 18 stored on any two of devices 12, 14, 16 contain ordered entries 20, 22, 24, e.g. movie titles, each having an order or index, such as a user preference or delivery timing, relative to the other entries in the respective list. Such lists 18 are local copies at each device, and are intended to be synchronized, at least at some point in time, to represent the same plurality of entries 20, 22, 24 in the same order or index. Further, via a user interface associated with each device, entries 20, 22, 24 can be added, deleted, and/or changed in order. Also, a local copy of list 18 at client 12 or 16 can be modified while client 12 or 16 is not connected to server 14 or while two clients 12 and 16 are not connected to each other. As such, modifying the respective list 18 on multiple devices 12, 14, 16 quasi-simultaneously can result in different versions 26, 28, 30 of list 18 if changes are made while one or several devices 12, 14, 16 are not connected during the modification or if changes are made simultaneously on multiple connected devices.

Accordingly, system 10 includes a reconciler 40 operable to detect differences between at least two versions 26, 28, 30 of list 18, and reconcile the differences to create a current list 42 representing a current version 44 of list 18. Current list 42 represents the most likely current version of list 18 based on merge rules 46 representing user expectations as to the relative accuracy of the exclusion or inclusion of, and the index of, each item in two different versions of the same list. More specifically, current list 42 includes a plurality of entries 43 each corresponding to an order or index 45 such that current list 42 represents the most likely up-to-date version of ordered list 18 based on considering the at least two different versions of the list. Reconciler 40 and its components may include, for example, hardware, software, firmware, executable instructions, any combination thereof, or any mechanism or combination of mechanisms operable to perform the functionality described herein. Further, for example, reconciler 40 may be resident at, accessed from or executed by any computer device, such as any one of wireless terminal 12, server 14, or wired terminal 16 in order to determine merged list 42 representing current version 44 of list 18.

Figure 2:
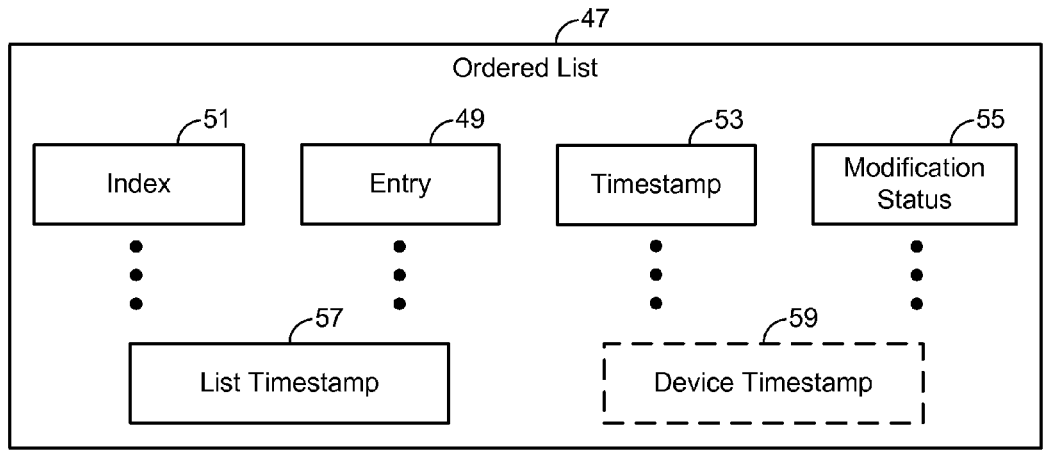
FIG. 2 is a schematic diagram of one aspect a representative ordered list of FIG. 1.

Referring to FIG. 2, in one aspect, an ordered list 47 represents any one of lists 18 and/or 42 (FIG. 1). Ordered list 47 may include a number of different fields useful by reconciler 40 (FIG. 1) in determining differences between lists and/or the relative order, inclusion, and/or exclusion of entries in current list 42 (FIG. 1). For example, ordered list 47 includes a plurality of entries 49, such as by not limited to identifiers or names of content, each further corresponding to one or more attributes, including but not limited to, one or more of: an order or index 51 representing a relative position or preference of the entry relative to other entries; an entry timestamp 53 indicating a time and/or date corresponding to the respective entry, such as a time and/or date of an add, a deletion or a change, such as a change in index; and, a modification status 55 indicating a modification relating to the respective entry 49, e.g. an add, a delete or a change, e.g. an index update. Moreover, ordered list 47 may additionally include a list timestamp 57. In one aspect, list timestamp 57 is a timestamp representing when the list was last synchronized. Accordingly, list timestamp 57 can represent a version of the list. Additionally, in some optional aspects (as indicated by the dashed lines), ordered list 47 may include or may be associated with a device timestamp 59 of the current time of the device that generated the respective ordered list. For example, for a comparison of different versions of a list from two different devices, both devices may send a current device timestamp 59 along with the respective ordered list 47 so that reconciler 40 can make sure both devices have the same time, thereby ensuring a proper basis for comparison. If the time between the devices differs, then reconciler 40 may take into account the time difference when making the comparisons discussed below.

Figure 3:
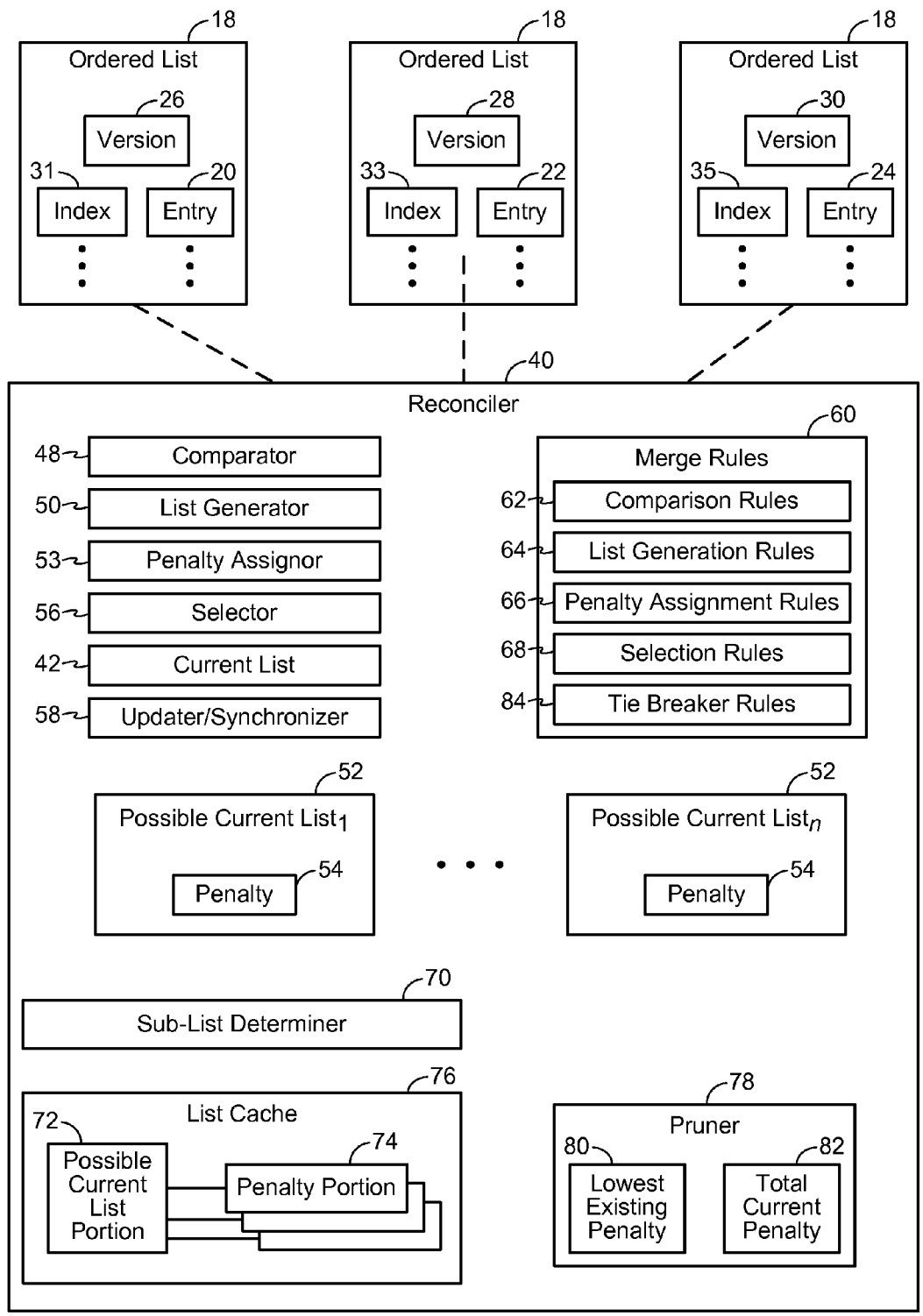
FIG. 3 is a schematic diagram of one aspect of a reconciler of FIG. 1.

Referring to FIG. 3, in one aspect, reconciler 40 includes a comparator 48 operable to detect differences between two or more versions 26, 28, 30 of list 18. Additionally, reconciler 40 includes a list generator 50 operable to generate all or some portion of n merged lists 52, where n is a number of lists representing all possible combinations of the respective two or more of the plurality of entries 20, 22, 24 based on these detected differences. Further, reconciler 40 includes a penalty assignor 53 operable to determine a penalty 54 for each of the possible current lists 50, or a portion thereof, based on the detected differences identified by comparator 48. Penalty 54 represents a confidence or likelihood of the respective list being the most up-to-date list. Also, reconciler 40 includes a selector 56 operable to determine which one of the possible current lists 50 to use as current list 42 based on a relative value of penalty 54 corresponding to each possible current list 52. Additionally, reconciler 40 may further include a synchronizer 58 operable to inform one or more devices 12, 14, 16 having list 18 of current list 42. In one aspect, the result of operations of reconciler 40 are that each device 12, 14, 16 has an identical list 18.

Moreover, reconciler 40 includes or has access to merge rules 60, which guide reconciler 40 in performing the functionalities to determine current list 42. In one aspect, for example, merge rules 60 may include, but are not limited to, rules such as: comparison rules 62, list generation rules 64, penalty assignment rules 66 and selection rules 68. Comparison rules 62 are rules for use in determining differences between lists. For example, comparison rules 62 identify a same entry if two entries have the same identifier, such as a name or code, and identify two different entries if the identifier does not match. List generation rules 64 are rules for use in determining how to generate each of the n possible current lists 52. For example, list generation rules 64 may include starting or continuing with a solution to form a possible current list by adding an entry to the list if a same entry is identified. Further, for example, list generation rules 64 may include creating two possible current lists if a different entry is identified, such as by adding each of the two different entries to different possible current lists. Penalty assignment rules 66 are rules for determining a penalty to assign to each of the n possible current lists 52. For example, penalty assignment rules 66 may include assigning no penalty to a possible current list if a same entry is identified. Further, for example, list generation rules 64 may include assigning a penalty to each of the two possible current lists when a different entry is identified, where the penalty may be variable based on the timestamp and index of the respective entry. Selection rules 68 are rules for determining how to pick one of the n possible current lists 52 to be current list 42. For example, selection rules 68 may include selecting as current list 42 the one of the n possible current lists 52 having the lowest penalty 54. Further, for example, selection rules 68 may include selecting as current list 42 the one of the n possible current lists 52 having the lowest penalty 54 and the most recent timestamp 53. It should be noted that merge rules 60 may be one integrated set of rules or a plurality of separate rules each relating to a given functionality.

Thus, reconciler 40 is operable to generate a tree of all possible solutions, e.g. the n possible current lists, for reconciling differences between two lists based on a stepwise comparison of entries in two different lists. For example, in such a tree, each branch represents an ordered selection of an entry in a respective possible current list. Further, reconciler 40 is operable to assign a penalty to each possible current list, where reconciler 40 assigns at least a portion of the penalty when the possible current lists diverge.

More specifically, comparator 48 is operable to receive a first version, e.g. one of versions 26, 28, 30, of ordered list 18 having a first plurality of ordered entries, e.g. one of 20, 22, 24, wherein each of the first plurality of ordered entries has a corresponding order index. Further, comparator 48 is operable to receive a second version, e.g. a different one of versions 26, 28, 30, of ordered list 18 having a second plurality of ordered entries, e.g. a different one of 20, 22, 24, wherein each of the second plurality of ordered entries has a corresponding order index. Comparator 48 may either itself determine that the first and second lists are different, or the fact that the lists are different may be communicated to reconciler 40 ahead of time.

In any case, comparator 48 is additionally operable to execute comparison rules 62 to compare, at one or more respective levels or indices, corresponding ones of the plurality of entries from the first version of the ordered list and the second version of the ordered list. For example, comparator 48 compares a first entry from a first version of the list with a first entry from a second version of the list. Such a comparison may iterate until all entries in each list have been considered.

Furthermore, based on the comparing, penalty assignor 53 is operable to execute penalty assignment rules 66 to assign a penalty 54 to each possible current list, or a portion thereof, when the comparing identifies a difference between respective ordered entries at a respective index. As such, penalty 54 comprises a cumulative penalty based on a sum of any sub-penalties assigned to any portion of the respective possible current list 52.

Also based on the comparing, list generator 50 is operable to execute list generator rules 64 to generate at least a portion of n possible, e.g. all possible, current lists resulting from reconciling the first version and the second version of the ordered list. As will be explained in more detail below, list generator 50 does not have to generate the full plurality of items for each of the n possible current list if it is determined that the remaining listing of ordered entries has already been evaluated. Additionally, list generator 50 is further operable to removing the respective ordered entries from the first version of the ordered list and the second version of the ordered list at the respective order index to define a remaining first version of the ordered list and a remaining second version of the ordered list, also referred to as respective sub-lists, for a next iterative comparison by comparator 48 and assignment of a penalty by penalty assignor 53.

In some aspects, reconciler 40 may additionally include a sub-list determiner 70 that is a part of or that works in combination with or that works prior to execution of comparator 48. Sub-list determiner 70 is operable to determine, such as by matching, if a particular remaining portion of an ordered list under evaluation has already been processed and the corresponding possible current list portion 72, with penalty portion 74, is stored in a list cache 76, such as a memory. As such, when sub-list determiner 70 identifies an already processed portion, processing resources can be saved by merely retrieving the results, e.g. the remaining portion of the list and the corresponding penalty, from list cache 76. Thus, sub-list determiner 70 may cause completion of one of the n possible current lists 52, based on determining a matching remaining portion, and further may direct comparator 48 to start working on a next one of the n possible current lists 52

Further, in some aspects, reconciler 40 may additionally include a pruner 78 operable to halt processing of a given one of the n possible current lists 52 if pruner 78 determines that a more feasible solution already exists. For example, pruner 78 is operable to identify or obtain a lowest existing penalty 80 based on the penalties 54 of the solved ones of the n possible current lists 52, and compare lowest existing penalty 80 to a total current penalty 82 of the given one of the n possible current lists 52 being processed. In this case, total current penalty 82 is a value of penalty 54 assigned to the portion of the given possible current list 52 at the respective point of processing. As such, pruner 78 may be a part of or may work in combination with or may work prior to execution of comparator 48. Thus, pruner 78 may direct comparator 48 to start working on a next one of the n possible current lists 52 if pruner 78 determines that a more feasible solution already exists.

Additionally, based on a completion of the comparing, list generating and penalty assigning, selector 56 is operable to execute selection rules 68 to select one of the n possible current lists 52 to be current list 42 representing the most up-to-date list version of list 18. For example, in one aspect, selector 56 is operable to select as current list 42 the one of the n possible current lists 52 having a lowest penalty 54 relative to the respective penalties 54 of the other possible current lists.

In case of a tie in a lowest value of penalty 54 between two or more of the n possible current lists 52, selector 56 may execute tie rules 84 to pick current list 42. Such tie rules 84 may include, but are not limited to, selecting the one of the tied possible current lists 52 having a first one of the entries 49 (FIG. 2) with the earliest timestamp 53 (FIG. 2).

Moreover, synchronizer 58 may further initiate storage of current list 42 in a memory, such as at a computer device including one or more of devices 12, 14, 16, or at some other computer device. As such, synchronizer 58 may synchronize one or more devices, such as devices 12, 14, 16, such that any device in need of current list 42 has the most up-to-date copy.

Figure 4:
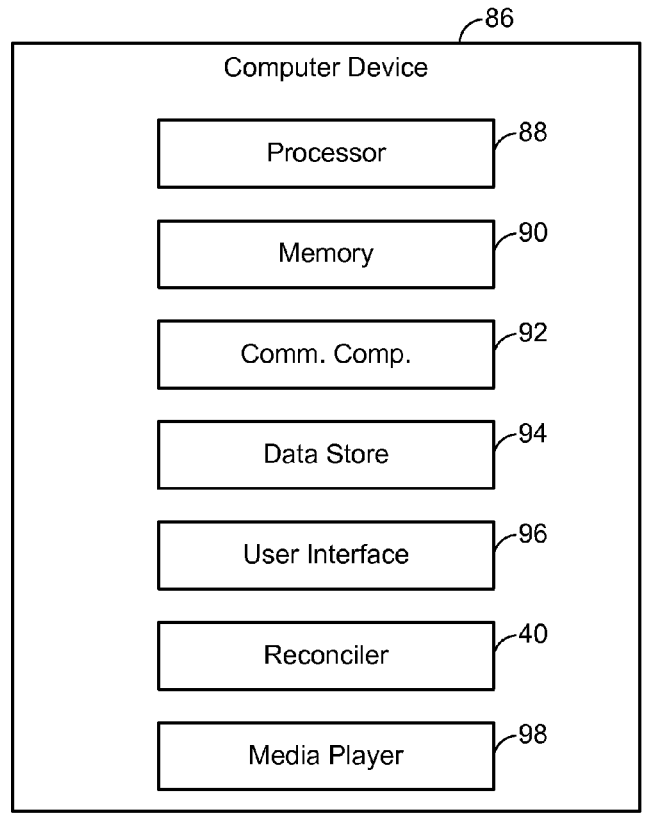
FIG. 4 is a schematic diagram of one aspect of a computer device of FIG. 1.

Referring to FIG. 4, in one aspect, any of devices 12, 14, 16 (FIG. 1) may be represented by computer device 86. Computer device 86 includes a processor 88 for carrying out processing functions associated with one or more of components and functions described herein. Processor 88 can include a single or multiple set of processors or multi-core processors. Moreover, processor 88 can be implemented as an integrated processing system and/or a distributed processing system.

Computer device 86 further includes a memory 90, such as for storing local versions of applications being executed by processor 88. Memory 90 can include ay type of memory usable by a computer, such as random access memory (RAM), read only memory (ROM), tapes, magnetic discs, optical discs, volatile memory, non-volatile memory, and any combination thereof.

Further, computer device 86 includes a communications component 92 that provides for establishing and maintaining communications with one or more parties utilizing hardware, software, and services as described herein. Communications component 94 may carry communications between components on computer device 86, as well as between computer device 86 and external devices, such as devices located across a communications network and/or devices serially or locally connected to computer device 86. For example, communications component 86 may include one or more buses, and may further include transmit chain components and receive chain components associated with a transmitter and receiver, respectively, operable for interfacing with external devices.

Additionally, computer device 86 may further include a data store 94, which can be any suitable combination of hardware and/or software, that provides for mass storage of information, databases, and programs employed in connection with aspects described herein. For example, data store 94 may be a data repository for applications not currently being executed by processor 88.

Computer device 86 may additionally include a user interface component 96 operable to receive inputs from a user of computer device 86, and further operable to generate outputs for presentation to the user. User interface component 96 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 96 may include one or more output devices, including but not limited to a display, a speaker, a haptic feedback mechanism, a printer, any other mechanism capable of presenting an output to a user, or any combination thereof.

Additionally, in some aspects, computer device 86 may include reconciler 40 to perform the functionality described herein.

Moreover, in some aspects, computer device 86 may include a media player 98 to obtain, manage and present content, such a content 34 (FIG. 1) to a user of computer device 86. For example, a user may manipulate user interface component 96 to cause computer device 86 to have processor 88 execute media player 98 to obtain content 34, which may be saved in data store 94. Further, a user may manipulate user interface component 96 to cause computer device 86 to have processor 88 execute media player 98 to present content 34 to the user via an output device of user interface component 96. Additionally, a user may manipulate user interface component 96 to cause computer device 86 to have processor 88 execute media player 98 to add, change or delete entries 49 (FIG. 2) in ordered list 47 (FIG. 2), which may be stored in data store 94. Thus, media player 98 may be operable to manage content on computer device 86.

Figure 5:
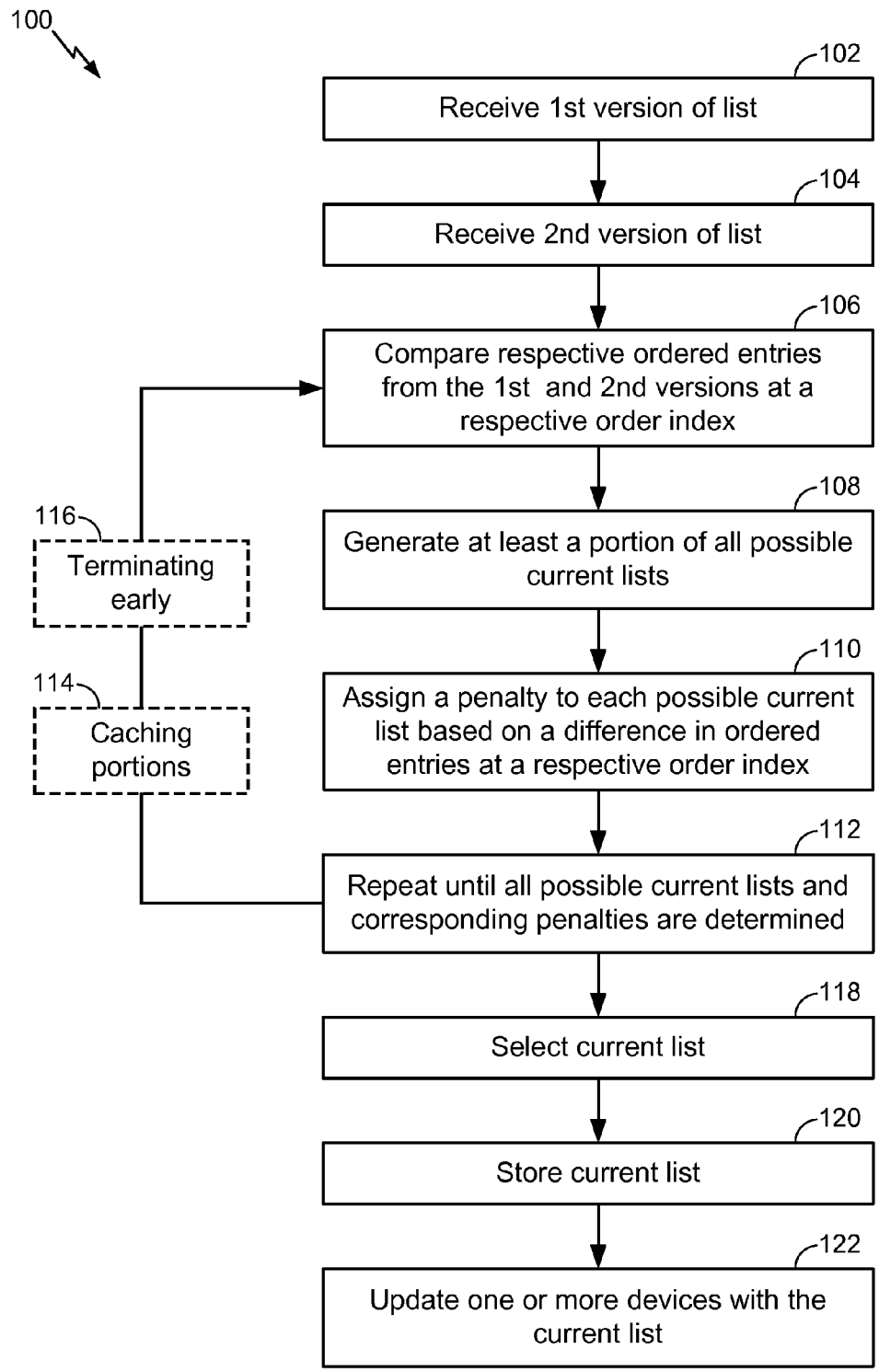
FIG. 5 is a flowchart of one aspect of a method of reconciling different versions of an ordered list.

Referring to FIG. 5, in operation, a method 100 of reconciling differences between lists of ordered entries and determining a current list having an current ordering of the entries includes applying a set of rules to merge the ordered lists in a manner that builds a tree of possible solutions, e.g. possible current lists, and assigns corresponding penalty values when the potential current lists diverge. Accordingly, method 100 enables selection of the current list based on the penalty values.

In one aspect, method 100 includes receiving, at a computer, a first version of an ordered list having a first plurality of ordered entries, wherein each of the first plurality of ordered entries has a corresponding order index (Block 102).

Further, method 100 includes receiving, at the computer, a second version of the ordered list having a second plurality of ordered entries, wherein each of the second plurality of ordered entries has a corresponding order index (Block 104).

In some optional aspects, each of the first and second versions of the list are received from separate devices, which may also include a current device timestamp to so that method can make sure both devices have the same time, and thus a proper basis for comparison exists. If the time between the devices differs, then the method may take into account the difference when making the comparisons discussed below. Further, in some optional aspects, for instance, the second plurality of ordered entries may include at least one entry in common with the first plurality of ordered entries.

For example, the receiving actions of Blocks 102 and 104 may be performed by one of devices 12, 14, 16 (FIG. 1) when the devices connect to one another, such as via communications network 38.

Also, method 100 includes comparing respective ordered entries from the first version of the ordered list and the second version of the ordered list at a respective order index (Block 106). For example, the comparing determines if the respective ordered entries are the same entry or not. Further, the comparing may be iterative such that all of the ordered entries are compared at each level or index in both lists.

Additionally, method 100 includes generating, based on the comparing, at least a portion of all possible current lists resulting from reconciling the first version and the second version of the ordered list (Block 108). For example, if the comparing identifies the respective ordered entries as being the entry, then the generating includes adding the respective ordered entry as the next item in one possible current list. Further, for example, if the comparing identifies the respective ordered entries as being different, then the generating includes creating two possible current lists—one list including any previously generated portion of a possible current list and adding one of the ordered entries as the next item, and another list including any previously generated portion of a possible current list and adding the other ordered entry as the next item.

Further, method 100 includes assigning a penalty to each possible current list when the comparing identifies a difference between respective ordered entries at a respective order index (Block 110). For example, the assigning of the penalty may involve a fixed value based on the comparing determining the difference. Additionally, for example, the assigning of the penalty may include a variable value depending on a timestamp of the respective ordered entry relative to a timestamp of a matching entry at a different index in the other list. For example, the variable penalty may increase the penalty assigned to such an entry in a possible current list if the entry has a higher index but a later timestamp, which follows the rule that it is less likely that the high index is correct if the timestamp is later than a lower index corresponding to the same entry in a different list. In other words, the rule assumes that the most recent timestamp represents a condition more likely to be correct.

Additionally, method 100 includes repeating the comparing, generating and assigning until all possible current lists and corresponding penalties are determined (Block 112). Although the repeating may be performed in any manner, it may be desired to direct the repeating to occur within a given one of the possible current lists in order to complete a branch of the tree and obtain a cumulative penalty for one or more possible current lists. Such a repeating action enables other actions, such as caching of possible current list portions and corresponding penalty portions (Block 114) and terminating processing, also referred to as pruning, prior to completing a given possible current list if the current penalty already exceeds the lowest penalty of a completed possible current list (Block 116).

Also, method 100 includes selecting one of the possible current lists as the current list (Block 118). For example, in one aspect, the selecting picks the one of the n possible current lists having a lowest penalty. Further, for example, in another aspect, the selecting picks the one of the n possible current lists having a lowest penalty and a more recent timestamp closer to the beginning of the list, e.g. higher up in the order or index.

Further, method 100 includes storing, at the computer, the current list as a current version of the ordered list (Block 120).

Moreover, method 100 includes updating another computer device with the current list (Block 122). For example, if the method involves two devices with two different lists, and the method is being performed on one of the two devices, then the updating can involve forwarding the current list to the other one of the two devices. Further, for example, if the method is performed by a third device in communication with the two devices with the two different lists, then the updating can involve forwarding the current list to both devices.

Additionally, it should be noted that although method 100 refers to two different lists, more than two different lists may be compared starting with the two lists having the oldest timestamp, then using the current list selected by method 100 in combination with the third oldest list, and repeating until all versions of the lists have been analyzed.

Further, if one of the lists is empty, such as one of the original list or a remaining portion thereof, e.g. a sub-list, apply a penalty equivalent to a size of the non-empty list. For example, as you traverse the tree and one of the sub-lists becomes empty, then the penalty would be applied. Then, save the order of the entries that led to this final solution, along with the total penalty accumulated for that possible current list.

Also, when analyzing each version of the list, if an entry 53 has a modification status 55 representing a deletion, then apply the deletion only if that deletion was the latest modification of that entry 53. In other words, if the same entry 53 is listed again in the list but with a different, e.g. non-deletion, modification status 55 and a more recent timestamp 53, then merge rules 60 may assume that the more recent timestamp reflects the more likely status of the respective entry 53.

Figure 6:
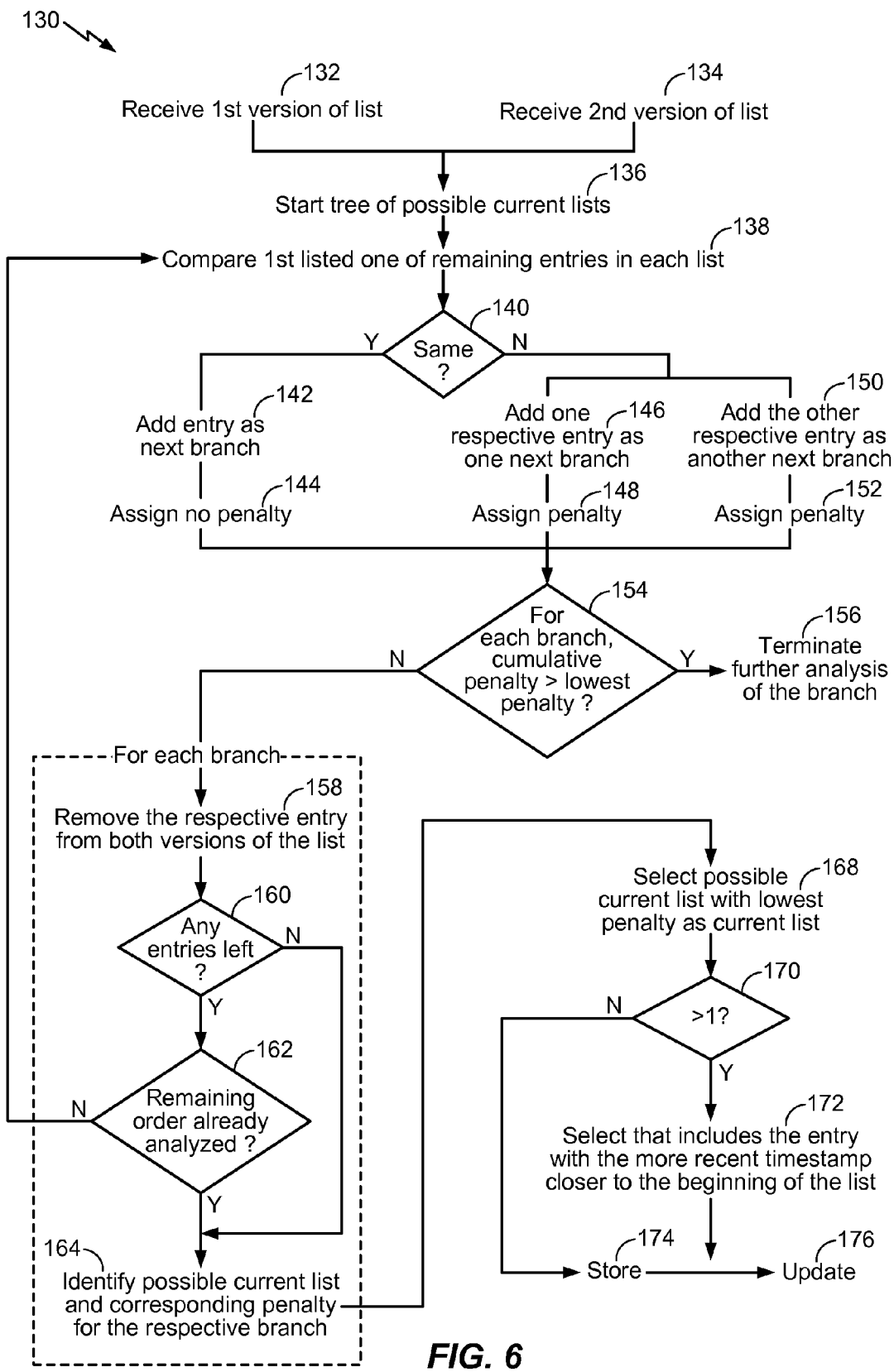
FIG. 6 is a flowchart of one aspect of a method of reconciling different versions of an ordered list.
Figure 7:
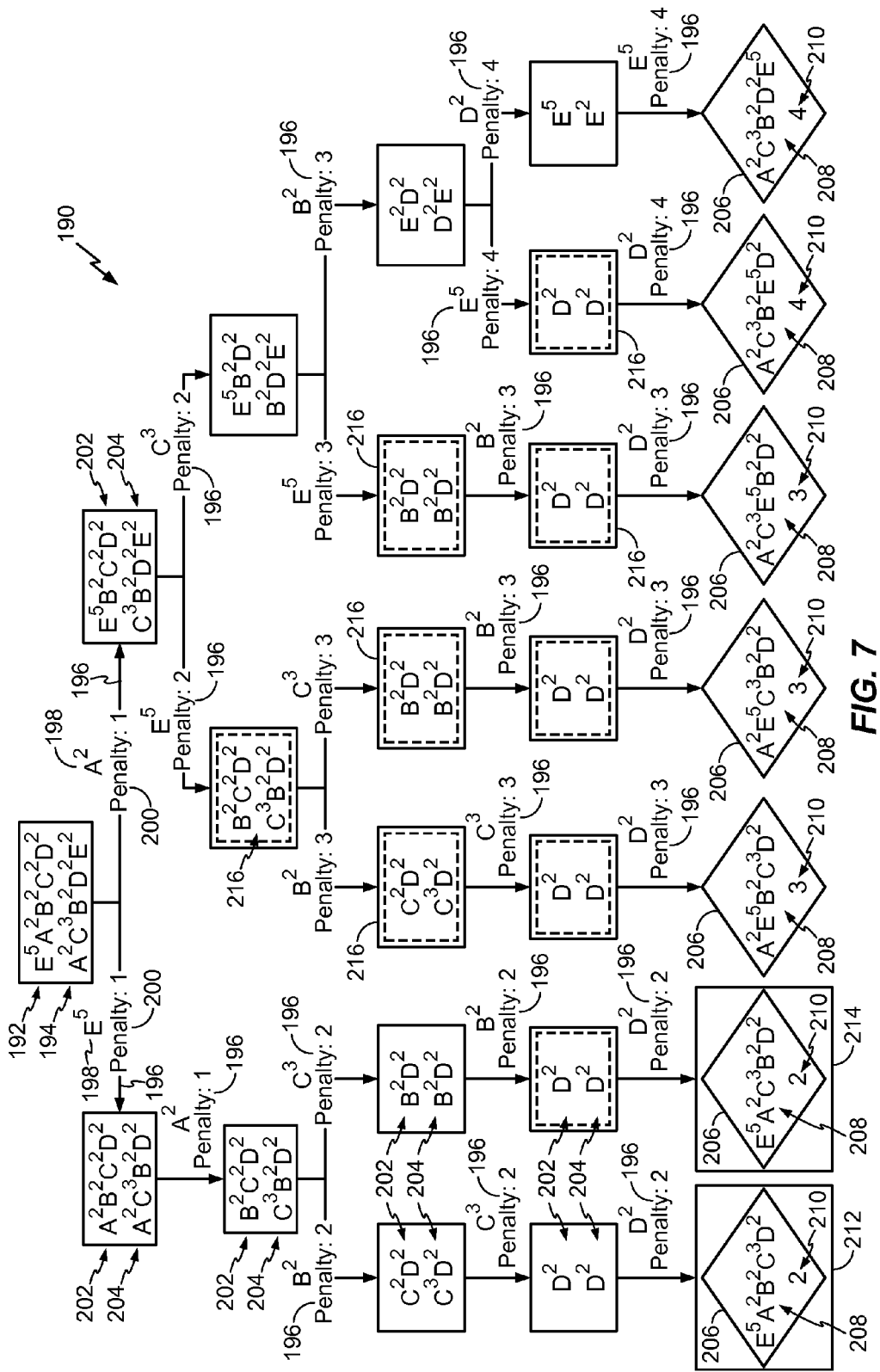
FIG. 7 is a schematic diagram of one aspect of a tree structure defined by the methods of FIGS. 5 and 6, wherein the tree structure includes branches that lead to leaves defining the n possible current lists and their corresponding penalties.

Referring to FIGS. 6 and 7, in a more specific example, a method 130 (FIG. 6) of reconciling different versions of a list generates a tree structure 190 (FIG. 7) having branches that lead to leaves defining the n possible current lists and their corresponding penalties, thereby enabling determination of the current list.

Method 130 included receiving a first version and a second version of the list (Blocks 132 and 134) and starting a tree of possible current lists (Block 136). For example, referring to FIG. 7, each list version 192 and 194 may be represented by a series of letters having number superscripts, where the letters identify an entry and where the numbers identify a timestamp, where the relative order (from left to right) of the letters correspond to an index, and where a higher number represents a more recent timestamp.

Method 130 further includes comparing a first listed one of remaining entries in each version of the list (Block 138). When starting the comparing for the first time, the first entry in each list is naturally the first overall entry, e.g. the first index, whereas subsequent comparing will evaluate later indices, as will be explained below.

Method 130 further includes determining if the respective entries are the same (Block 140). If the entries are the same, then method 130 includes adding the entry as the next branch in the tree defining all of the possible current lists, and assigning no penalty to that branch (Blocks 142 and 144). On the other hand, if the entries are not the same, then method 130 includes adding one of the entries as one next branch of the tree (Block 146) and assigning a corresponding penalty to that branch (Block 148). Further, if the entries are not the same, then method 130 includes adding the other one of the entries as another next branch of the tree (Block 150) and assigning a corresponding penalty to that branch (Block 152). For example, when constructing the tree of possible lists, and the beginning of the remaining sub-lists are different, each different entry becomes a new branch in the tree. For each branch where you chose a particular entry, the other list which did not have that entry at the beginning of the list may have that entry later in that list. The penalty assigned is the index value of the entry that is later in the list, if (and only if) it has a later timestamp. That means that a more recent update had put the entry later in the list, which should cause a larger penalty. So, if the method includes pulling out an entry from the other list with a later timestamp, then the penalty is a value of "1" plus the index value of the entry you are pulling out, otherwise assigning the penalty may include assigning a penalty having a value of "1" if the entries are different. Accordingly, a divergence between the versions of the list at the respective index causes the generation of an additional possible current list along with a respective penalty, which may be variable depending on a timestamp corresponding to the entry.

In one optional resource saving action, method 130 may include determining, for each branch, whether the cumulative penalty for the branch is greater than a lowest penalty of an entire one of the possible current lists (Block 154). If so, then method 130 saves resources by terminating further analysis of the branch (Block 156), and any resulting possible current list will not be a feasible one to select. If the cumulative penalty is lower than the lowest penalty, then method 130 allows further analysis.

Continuing, for each branch, method 130 includes removing the respective entry from both versions of the list (Block 158), and repeating the comparing (Blocks 138 and 140), branch adding (Blocks 142, 146 and 150, as necessary) and not assigning or assigning a penalty (Blocks 144, 148 and 152, as necessary) until identifying all possible current lists and the corresponding penalty for each branch (Block 164). For example, method 130 includes checking whether any entries are left in the remaining versions of the list (Block 160). If not, then the respective possible current list can be identified (Block 164). If so, then method 130 may include a resource saving action such as determining if the order of entries in the remaining versions have already been analyzed (Block 162). If they have not been analyzed, then method 130 allows repetition of the above-noted actions, whereas if they have been analyzed, method 130 provides for the respective possible current list to be identified (Block 164).

Once all branches of entries are analyzed, then method 130 further includes selecting the possible current list having the lowest penalty to be the current list (Block 168). If method 130 determines (Block 170) that more than one possible current list has the lowest penalty, then method 130 selects the one that includes the entry with the more recent timestamp closer to the beginning of the list (Block 172). Subsequently, or if only one list with the lowest penalty is selected, method 130 stores the selected list as the current list (Block 174) and optionally updates one or more devices with the current list (Block 178).

For example, referring to FIG. 7, the first entry of version 192 is "E," while the first entry of version 194 is "A." Since "E" is not the same as "A," branches 196 are formed with the respective entry 198 and the respective penalty 200. In this case, the respective penalty 200 for each branch has a value of "1" based on the difference in entries. Further, after removing the respective entry from each version of the list, a remaining version 202 and 204 of each list is used for further analysis. Continuing down to the next level in the hierarchy of the "E" side branch, the next first listed remaining entries are both "A." As such, "A" is added as a new branch and no penalty is assigned, however, the prior penalty of "1" is accumulated. Continuing down to the next level in the hierarchy of the "EA" side branch, the next first listed remaining entries are "B" and "C," which are different, so two new braches 196 are created, each having a respective one of the different entries and including a cumulative penalty equal to the index-specific penalty plus any prior penalties. In this case, the value of the index-specific penalty is "1" for each of the different entries, which is added to the prior penalty value of "1" to obtain a cumulative penalty value of "2." The remaining branches 196 are evaluated in a similar manner using the above-stated merge rules until the branches 196 form leaves 206 of the n possible current lists are determined, where each possible current list 206 represents a different ordering of the plurality of entries 208 and a corresponding cumulative penalty 210.

It should be noted that by solving for the possible current list(s) 206 down one branch of tree 190 allows a current lowest penalty to be determined. Such an initial lowest penalty may be used by pruner to provide for early termination of processing of any braches 196 that accumulate a penalty that exceeds the current lowest penalty. In this case, if the left side branches of tree 190 are evaluated first, then any branch accumulating a penalty having a value of more than "2," such as some of the branches on the right side of tree 190, can be pruned.

Furthermore, solving for the possible current list(s) 206 down one branch of tree 190 allows a list cache to be formed so that remaining portions of the versions of the list that match already solved remaining portions of the list, for example see the boxes marked 216, do not have to be re-analyzed.

Additionally, tree 190 includes two possible current lists 212 and 214 having the lowest penalty of "2": $E^5A^2B^2C^3D^2$ and $E^5A^2C^3B^2D^2$. In one aspect, to determine the list to select, merge rules dictate that the selected list is the one with the entry having the most recent timestamp closer to the head of the list. In this case, both start with E5A2, so we look at the next item: $B^2$ versus $C^3$. $C^3$ is the more recent change, so the merge rules dictate selecting that choice: $E^5A^2C^3B^2D^2$. This makes sense because in all likelihood, the user moved item "E" to the front and switched B and C, which is represented by this selection.

In another aspect, to determine the list to select, the sum of timestamps is compared. In this case, the sum of the timestamps is the same, just in a different order, so the selection is based on the above-described order/more recent timestamp rule. In other words, for breaking ties in the lowest penalty scores found, the sum of the timestamps could be used to determine which of the lists is "more up to date" (e.g. has a larger timestamp sum). In the example above, the sums are equal, so the process described above is used to break the tie.

Referring to FIGS. 8-11, different scenarios are provided for reconciliation of different versions of lists, where letters denote different entries in the lists, time indicates when a change was made, and the left and right lists (list 1 and list 2, respectively) are reconciled into the current list. In particular, FIG. 8 relates to a scenario 250 in which only one list has been modified, e.g. the "3PM" entries on "List 2" are the only changes. FIGS. 9 and 10 relates to respective scenarios 300 and 400 for reconciling lists with multiple changes. FIG. 11 relates to a scenario 500 where the current list accounts for additions. And, FIG. 12 relates to a scenario 600 where the current list accounts for deletions.

Figure 13:
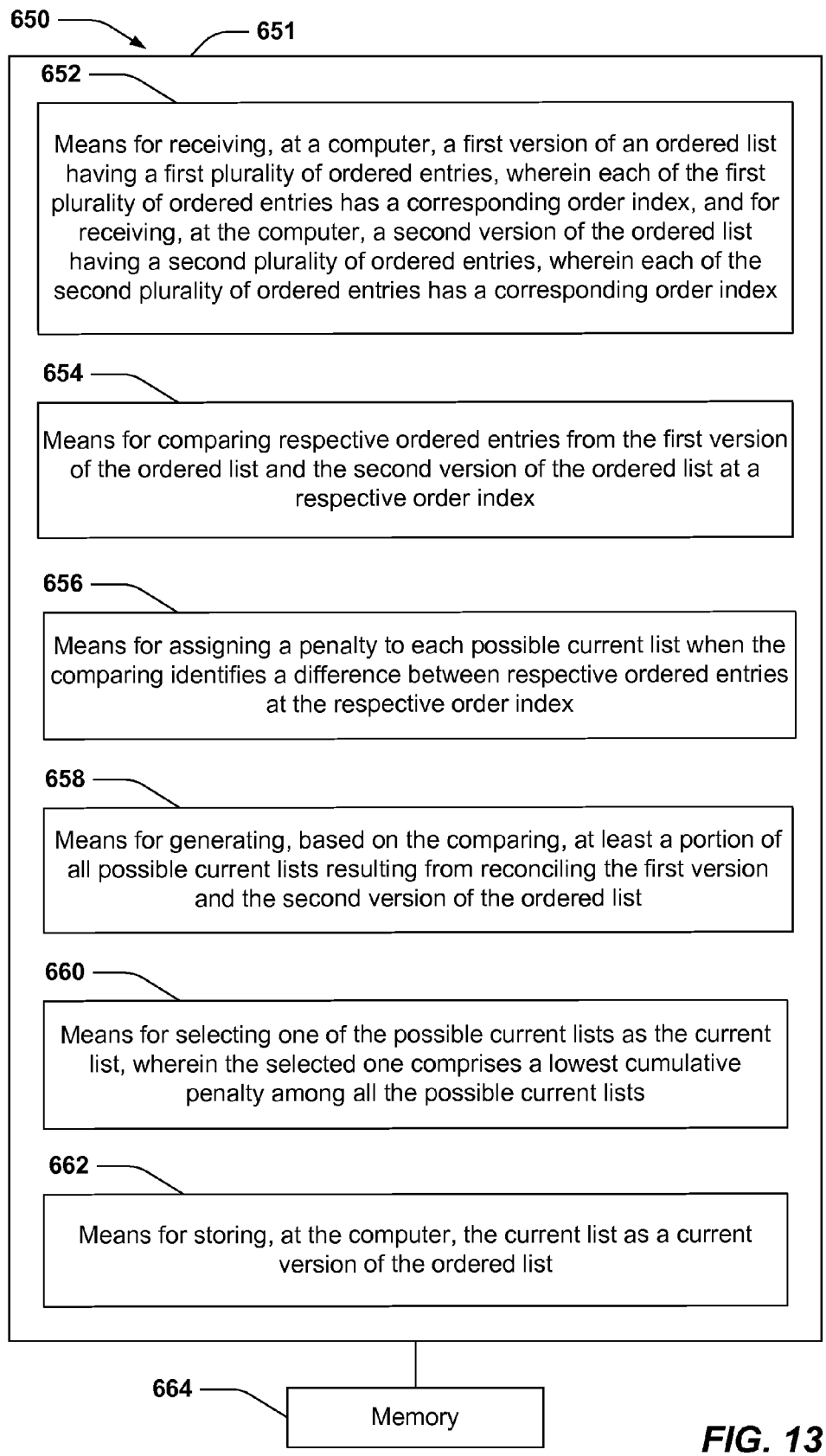
FIG. 13 is an illustration of an example system that reconciles different versions of an ordered list.

With reference to FIG. 13, illustrated is a system 650 that facilitates reconciling different versions of an ordered list. For example, system 650 can reside within a computer device. It is to be appreciated that system 650 is represented as including functional blocks, which can be functional blocks that represent functions implemented by a processor, software, or combination thereof (e.g., firmware). System 650 includes a logical grouping 651 of electrical components that can act in conjunction. For instance, logical grouping 651 can include means 652 for receiving, at a computer, a first version of an ordered list having a first plurality of ordered entries, wherein each of the first plurality of ordered entries has a corresponding order index, and for receiving, at the computer, a second version of the ordered list having a second plurality of ordered entries, wherein each of the second plurality of ordered entries has a corresponding order index.

Further, logical grouping 651 can comprise means 654 for comparing respective ordered entries from the first version of the ordered list and the second version of the ordered list at a respective order index. Furthermore, logical grouping 651 can comprise means 656 for means for assigning a penalty to each possible current list when the comparing identifies a difference between respective ordered entries at the respective order index. Also, logical grouping 651 can comprise means 658 for generating, based on the comparing, at least a portion of all possible current lists resulting from reconciling the first version and the second version of the ordered list Further, logical grouping 651 can comprise means 660 means for selecting one of the possible current lists as the current list, wherein the selected one comprises a lowest cumulative penalty among all the possible current lists. Additionally, logical grouping 651 can comprise means 662 for storing, at the computer, the current list as a current version of the ordered list.

Additionally, system 650 can include a memory 664 that retains instructions for executing functions associated with the electrical components of logical grouping 651. While shown as being external to memory 664, it is to be understood that one or more of the electrical components of logical grouping 651 can exist within memory 664.

Figure 14:
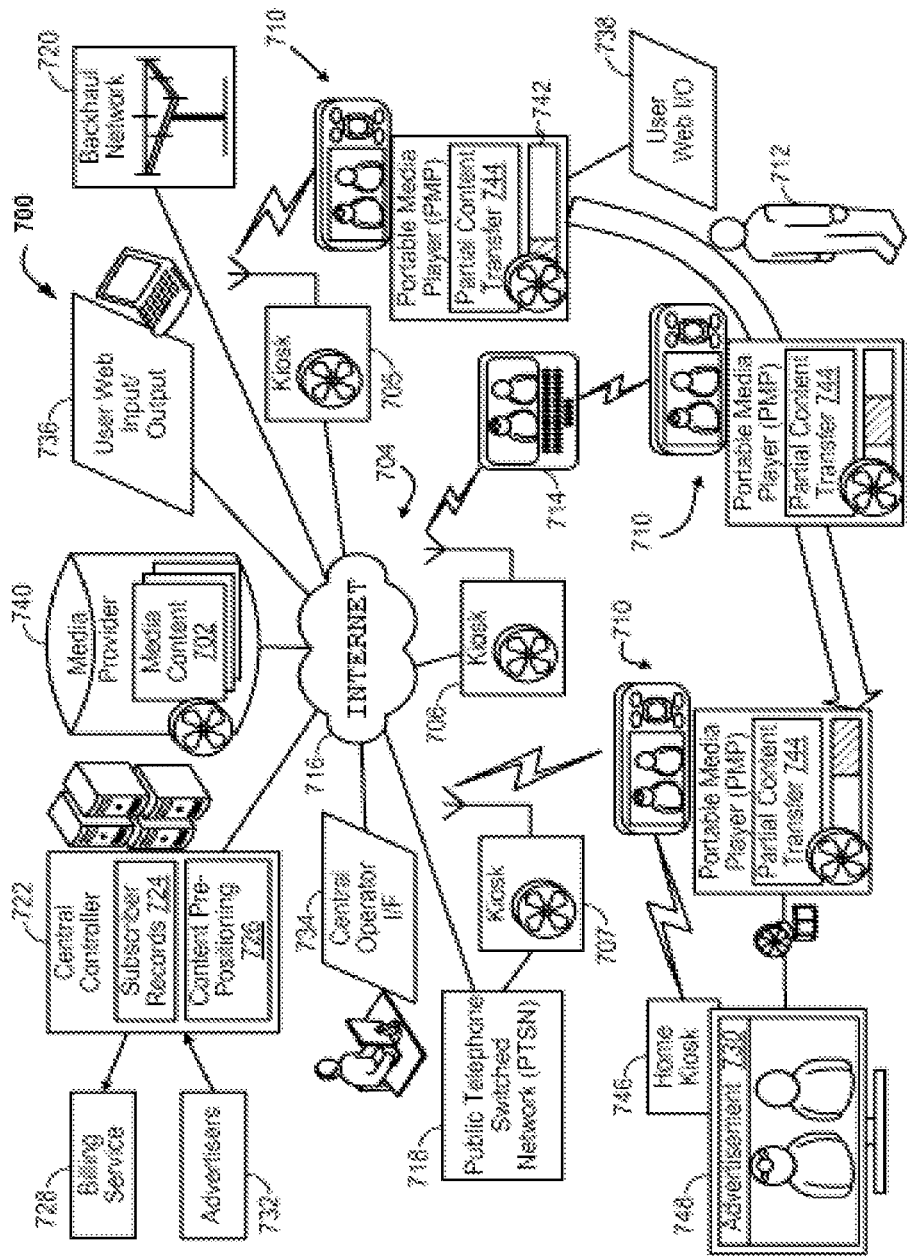
FIG. 14 is a schematic diagram of one aspect of a system for delivering media content to a communication device.

With reference to FIG. 14, a content delivery system 700 is shown that may be used in conjunction with present aspects to deliver media content to wireless communications devices. Specifically, in aspects in which the ordered list is a media content acquisition priority list, the system 700 may be relied upon to deliver media content to the device in accordance with the ordered priority for acquiring media content as defined by the list. The system 700 of FIG. 14 improves upon delivery of media content 702 over a communication network 704 by utilizing a plurality of strategically placed vendor kiosks 705, 706, 707 that have an economic incentive to service a plurality of wireless-capable portable devices. It should be appreciated that portable devices can comprise a number of types handheld or carried apparatus with a unitary or distributed construction that perform a more dedicated function (e.g., solely media player) or are a converged device having media player as one function (e.g., smart phone). In the illustrative depiction, a population of wireless-capable portable devices, including a converged handheld computer 714, is depicted as including a computer device referred to as a personal media player (PMP) 710, which may be carried by a user 712.

The communication network 704 can provide communication channels of varying data throughput, interoperability and coverage areas. For example, portions of the communication network 704 can comprise a public or private Internet 716, public telephone switched network (PSTN) 718, and/or an over-the-air broadcast carrier (e.g., unicast, multicast, one-way, two-way, WiMax, cellular telephone, etc.), depicted as a backhaul network 720 for media content distribution purposes. In the exemplary depiction, the communication channel via the PTSN 718 to vendor kiosk 707 is very economical, albeit slow, for downloading large media files and provides an opportunity for prepositioning popular catalog selections well in advance of a user 712 being in proximity.

A network controller 722 manages the content delivery system 700 by maintaining a subscriber record data structure 724 and content pre-positioning tracking data structure 726 that is reflected in updated catalogs. The central controller 722 relays billing and credits to a billing service 728 and receives advertisements 730 from advertisers 732 for merging or coupling in some instances with delivered media content 702. A central operator interface (I/F) 734 can provide human interaction/configuration of central controller 722, operator assistance via the PTSN 718 with users 712, or facilitating a user web input/output (I/O) service 736 for subscribing or for receiving selections. Web-enabled portable devices, such as depicted at 738, can access this web I/O 734 directly. Media providers 740 that provide access to the media content 702 can facilitate data rights management (DRM) for end user access and use limitations on the media content 702.

In an illustrative use case, the PMP 710 enters a coverage area of the kiosk 706, resulting in receiving a first portion of a selection, which can include user indication as depicted at 742. Upon leaving the coverage area or shutdown of the PMP 710, a partial content transfer module 744 verifies the integrity of the partial transfer, prepares a report to the network for the next opportunity to upload, and in some instances formats the partial transfer for playback. Subsequently, the PMP 710 forms an ad hoc network with another subscribing portable device 714 that is able to transfer another portion of the selection previously downloaded or relayed from kiosk 706. Subsequently, the PMP 710 completes the download from kiosk 707, which can be the same device as a home kiosk 746 that archives or supplements the downloaded selection from the PMP 710. The home kiosk 746 (e.g., a set-top box, home computer, dedicated device, etc.) or the PMP 710, in some aspects, can then stream or download the media content for playback on a full-size display monitor 748.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A computer-executable method of reconciling different versions of an ordered list, comprising:
   receiving, at a computer, a first version of an ordered list having a first plurality of ordered entries, wherein the first plurality of ordered entries have respectively associated order indexes;
   receiving a second version of the ordered list having a second plurality of ordered entries, wherein the second plurality of ordered entries have respectively associated order indexes;
   comparing, at a selected order index, respective ordered entries from the first and second versions of the ordered list;
   generating, based on the comparing, at least a portion of all possible current lists that reconcile the first and second versions of the ordered list;
   for each possible current list, accumulating a penalty when the comparing identifies a difference between the respective ordered entries;
   selecting one of the possible current lists that has a lowest accumulated penalty among all the possible current lists; and
   storing the selected one of the possible current lists as a current version of the ordered list;
   wherein the comparing, generating and accumulating are repeated for at least one further selected order index, and wherein said repeated generating produces at least one said possible current list completely.

2. The method of claim 1, wherein generating at least a portion of all possible current lists further comprises generating at least a portion of a new possible current list when the comparing identifies a difference between the respective ordered entries.

3. The method of claim 1, further comprising:
   removing the respective ordered entries from the first and second versions of the ordered list to define a remaining first version of the ordered list and a remaining second version of the ordered list;
   determining if the comparing, the assigning and the generating have already been applied to the remaining first and second versions of the ordered list; and
   terminating subsequent comparing, subsequent assigning and subsequent generating relative to the remaining first and second versions of the ordered list if the comparing, the assigning and the generating have already been applied.

4. The method of claim 1, further comprising:
   determining a current lowest accumulated penalty associated with one of the possible current lists;
   removing the respective ordered entries from the first and second versions of the ordered list to define a remaining first version of the ordered list and a remaining second version of the ordered list;
   determining an accumulated penalty for a portion of a possible current list corresponding to the remaining first and second versions of the ordered list; and
   terminating subsequent comparing, subsequent assigning and subsequent generating of the remaining first and second versions of the ordered list if the accumulated penalty is greater than the current lowest accumulated penalty.

5. The method of claim 1, wherein accumulating the penalty comprises assigning a variable penalty associated with the comparing of the respective ordered entries, and wherein the variable penalty varies depending on a relative timing of matching ordered entries in the first and second versions of the ordered list.

6. The method of claim 1, further comprising refraining from accumulating any penalty when the comparing identifies a match between the respective ordered entries.

7. The method of claim 1, wherein one of the compared ordered entries has a modification status corresponding to a deletion, and wherein generating further comprises applying the deletion to exclude the one ordered entry from the corresponding possible current list if the deletion was a latest modification to the one ordered entry.

8. The method of claim 1, wherein the accumulating further comprises accumulating a same accumulated penalty for at least two of the possible current lists, wherein each of the at least two possible current lists contains ordered entries that have respectively associated order indexes and respectively associated timestamps, and wherein the selecting further comprises selecting one of the at least two possible current lists that has an ordered entry with a more recent timestamp closer to a beginning of the possible current list.

9. The method of claim 1, wherein the first version of the ordered list comprises a first list timestamp, wherein the second version of the ordered list comprises a second list timestamp, and further comprising:
   reconciling more than two different versions of the ordered list in order of least recent timestamps, wherein the first list timestamp and the second list timestamp are least recent; and
   performing the comparing, the assigning and the generating relative to the current version of the ordered list and a next one of the more than two different versions of the ordered list, wherein the next one comprises a next oldest list timestamp.

10. The method of claim 1, further comprising updating at least one other computer device with the current version of the ordered list.

11. The method of claim 1, wherein the second plurality of ordered entries comprises at least one entry in common with the first plurality of ordered entries.

12. At least one processor configured to reconcile different versions of an ordered list, comprising:
   a first module for receiving a first version of an ordered list having a first plurality of ordered entries, wherein the first plurality of ordered entries have respectively associated order indexes, and for receiving a second version of the ordered list having a second plurality of ordered entries, wherein the second plurality of ordered entries have respectively associated order indexes;

a second module for comparing, at a selected order index, respective ordered entries from the first and second versions of the ordered list;

a third module for generating, based on the comparing, at least a portion of all possible current lists that reconcile the first and second versions of the ordered list; and a fourth module for accumulating, for each possible current list, a penalty when the comparing identifies a difference between the respective ordered entries; and a fifth module for selecting one of the possible current lists that has a lowest accumulated penalty among all the possible current lists, and for storing the selected one of the possible current lists as a current version of the ordered list;

wherein the comparing, generating and accumulating are repeated for at least one further selected order index, and wherein said repeated generating produces at least one said possible current list completely.

13. A computer program product stored in a memory and configured to reconcile different versions of an ordered list, comprising:

a non-transitory computer-readable storage medium comprising:

a first set of codes for causing a computer to receive a first version of an ordered list having a first plurality of ordered entries, wherein the first plurality of ordered entries have respectively associated order indexes, and to receive a second version of the ordered list having a second plurality of ordered entries, wherein the second plurality of ordered entries have respectively associated order indexes;

a second set of codes for causing the computer to compare, at a selected order index, respective ordered entries from the first and the second versions of the ordered list;

a third set of codes for causing the computer to generate, based on the comparing, at least a portion of all possible current lists that reconcile the first and second versions of the ordered list;

a fourth set of codes for causing the computer to accumulate, for each possible current list, a penalty when the comparing identifies a difference between the respective ordered entries;

a fifth set of codes for causing the computer to select one of the possible current lists that has a lowest accumulated penalty among all the possible current lists, and for storing the selected one of the possible current lists as a current version of the ordered list;

wherein the comparing, generating and accumulating are repeated for at least one further selected order index, and wherein said repeated generating produces at least one said possible current list completely.

14. An apparatus for reconciling different versions of an ordered list, comprising:

means for receiving, at a computer, a first version of an ordered list having a first plurality of ordered entries, wherein the first plurality of ordered entries have respectively associated order indexes, and for receiving, at the computer, a second version of the ordered list having a second plurality of ordered entries, wherein the second plurality of ordered entries have respectively associated order indexes;

means for comparing, at a selected order index, respective ordered entries from the first and second versions of the ordered list;

means for generating, based on the comparing, at least a portion of all possible current lists that reconcile the first and second versions of the ordered list;

means for accumulating, for each possible current list, a penalty when the comparing identifies a difference between the respective ordered entries;

means for selecting one of the possible current lists that has a lowest accumulated penalty among all the possible current lists; and means for storing, at the computer, the selected one of the possible current lists as a current version of the ordered list;

wherein the comparing, generating and accumulating are repeated for at least one further selected order index, and wherein said repeated generating produces at least one said possible current list completely.

15. A reconciler apparatus configured to reconcile different versions of an ordered list, comprising:

an input for receiving a first version of an ordered list having a first plurality of ordered entries, wherein the first plurality of ordered entries have respectively associated order indexes, and to receive a second version of the ordered list having a second plurality of ordered entries, wherein the second plurality of ordered entries have respectively associated order indexes;

a comparator coupled to said input and operable to compare, at a selected order index, respective ordered entries from the first and second versions of the ordered list;

a list generator coupled to said comparator and operable to generate, based on the comparing, at least a portion of all possible current lists that reconcile the first and second versions of the ordered list;

a penalty assignor coupled to said comparator and operable to accumulate, for each possible current list, a penalty when the comparing identifies a difference between the respective ordered entries;

a selector coupled to said list generator and operable to select one of the possible current lists that has a lowest accumulated penalty among all the possible current lists; and a memory operable to store the selected one of the possible current lists as a current version of the ordered list;

wherein the comparing, generating and accumulating are repeated for at least one further selected order index, and wherein said repeated generating produces at least one said possible current list completely.

16. The apparatus of claim 15, wherein the list generator is further operable to generate at least a portion of a new possible current list when the comparator identifies a difference between the respective ordered entries.

17. The apparatus of claim 15, further comprising:

wherein the list generator is further operable to remove the respective ordered entries from the first version and second versions of the ordered list to define a remaining first version of the ordered list and a remaining second version of the ordered list;

a sub-list determiner coupled to the list generator and operable to determine if the comparing, the assigning and the generating have already been applied to the remaining first and second versions of the ordered list; and wherein the sub-list determiner is further coupled to the comparator and the penalty assignor and operable to terminate subsequent comparing, subsequent assigning and subsequent generating relative to the remaining first and second versions of the ordered list if the comparing, the assigning and the generating have already been applied.

18. The apparatus of claim 15, wherein the penalty assignor is further operable to determine a current lowest accumulated penalty associated with one of the possible current lists generated by the list generator, wherein the list generator is further operable to remove respective ordered entries from the first and second versions of the ordered list to define a remaining first version of the ordered list and a remaining second version of the ordered list, wherein the penalty assignor is further operable to determine an accumulated penalty for a portion of a possible current list corresponding to the remaining first and second versions of the ordered list, and further comprising a pruner coupled to the comparator, the penalty assignor and the list generator and operable to terminate subsequent comparing, subsequent assigning and subsequent generating relative to the remaining first and second versions of the ordered list if the accumulated penalty is greater than the lowest accumulated penalty.

19. The apparatus of claim 15, wherein the penalty assignor is further operable to assign a variable penalty associated with the comparing of the respective ordered entries, and wherein the variable penalty varies depending on a relative timing of matching ordered entries in the first and second versions of the ordered list.

20. The apparatus of claim 15, wherein the penalty assignor is further operable to refrain from accumulating any penalty when the comparing identifies a match between the respective ordered entries.

21. The apparatus of claim 15, wherein one of the corresponding ordered entries has a modification status corresponding to a deletion, and wherein the list generator is further operable to apply the deletion to exclude the one ordered entry from the corresponding possible current list if the deletion was a latest modification to the one ordered entry.

22. The apparatus of claim 15, wherein the penalty assignor is further operable to accumulate a same accumulated penalty for at least two of the possible current lists, wherein each of the at least two possible current lists contains ordered entries that have respectively associated order indexes and respectively associated timestamps, and wherein the selector is further operable to select, according to tie rules, one of the at least two possible current lists that has an ordered entry with a more recent timestamp closer to a beginning of the possible current list.

23. The apparatus of claim 15, wherein the first version of the ordered list comprises a first list timestamp, wherein the second version of the ordered list comprises a second list timestamp, wherein said apparatus is operable to reconcile more than two different versions of the ordered list in order of least recent timestamps, wherein the first list timestamp and the second list timestamp are least recent, wherein said apparatus is further operable to perform the comparing, the assigning and the generating relative to the current version of the ordered list and a next one of the more than two different versions of the ordered list, and wherein the next one comprises a next oldest list timestamp.

24. The apparatus of claim 15, further comprising a synchronizer operable to update at least one other computer device with the current version of the ordered list.

* * * * *